(12) United States Patent
Drapeau et al.

(10) Patent No.: US 12,212,681 B1
(45) Date of Patent: Jan. 28, 2025

(54) SYSTEMS AND METHODS FOR SECURE IDENTIFIERS FOR ELECTRONIC TRANSACTIONS

(71) Applicant: Stripe, Inc., San Francisco, CA (US)

(72) Inventors: Ryan Drapeau, Seattle, WA (US); Leela Senthil Nathan, Seattle, WA (US); Kefeng Chen, Kirkland, WA (US); Ryan Koven, New York, NY (US); Joseph Kirwin, Victoria (CA)

(73) Assignee: STRIPE, INC., San Francisco, CA (US)

( * ) Notice: Subject to any disclaimer, the term of this patent is extended or adjusted under 35 U.S.C. 154(b) by 599 days.

(21) Appl. No.: 17/130,574

(22) Filed: Dec. 22, 2020

(51) Int. Cl.
*H04L 9/32* (2006.01)
*G06F 9/54* (2006.01)
(Continued)

(52) U.S. Cl.
CPC .......... *H04L 9/3242* (2013.01); *G06F 9/546* (2013.01); *G06N 20/00* (2019.01); *G06Q 20/085* (2013.01); *G06Q 20/34* (2013.01); *G06Q 20/3825* (2013.01); *G06Q 20/3827* (2013.01); *G06Q 20/4014* (2013.01); *G06Q 20/4016* (2013.01); *G06Q 20/405* (2013.01); *G06Q 30/0185* (2013.01); *H04L 9/3226* (2013.01); *G06Q 40/02* (2013.01); *G06Q 2220/00* (2013.01); *H04L 67/146* (2013.01); *H04L 2209/56* (2013.01)

(58) Field of Classification Search
CPC ... H04L 9/3242; H04L 9/3226; H04L 67/146; H04L 2209/56; G06F 9/546; G06N 20/00; G06Q 20/085; G06Q 20/34; G06Q 20/3825; G06Q 20/3827; G06Q 20/4014; G06Q 20/4016; G06Q 20/405; G06Q 30/0185; G06Q 40/02; G06Q 2220/00
See application file for complete search history.

(56) References Cited

U.S. PATENT DOCUMENTS 9,450,758 B1 *   9/2016   Allen .................... H04L 9/3297
9,754,100 B1 *   9/2017   Hitchcock ............ H04L 9/0891
(Continued)

OTHER PUBLICATIONS

Android developers. Docs. Reference. Java, "public static final class Settings.Secure," https://developer.android.com/reference/android/provider/Settings.Secure#constants.
(Continued)

*Primary Examiner* — Shewaye Gelagay
*Assistant Examiner* — Carlton Johnson
(74) *Attorney, Agent, or Firm* — Foley & Lardner LLP

(57) ABSTRACT

A method and apparatus for using cryptographically signed secure identifiers to detect fraud during network based transactions are described. The method may include receiving a transaction from a user device, the transaction comprising a secure identifier purported to be associated with the user device, and the transaction further comprising transaction data. The method may also include extracting a first identifier and a second identifier from the secure identifier purported to be associated with the user device, and then regenerating a true second identifier using the first identifier. Furthermore, when it is determined that the true second identifier matches the second identifier extracted from the secure identifier purported to be associated with the user device, the method may include determining that the secure identifier is valid, and processing the transaction based at least in part on the determination that the secure identifier is valid.

16 Claims, 7 Drawing Sheets

(51) Int. Cl.
*G06N 20/00* (2019.01)
*G06Q 20/08* (2012.01)
*G06Q 20/34* (2012.01)
*G06Q 20/38* (2012.01)
*G06Q 20/40* (2012.01)
*G06Q 30/018* (2023.01)
G06Q 40/02 (2023.01)
H04L 67/146 (2022.01)

(56) References Cited

U.S. PATENT DOCUMENTS

| | | | |
|---|---|---|---|
| 10,122,721 B2* | 11/2018 | Neafsey | H04L 63/08 |
| 2017/0353859 A1* | 12/2017 | Idnani | H04W 12/08 |
| 2020/0294056 A1* | 9/2020 | Patel | H04L 9/008 |
| 2021/0201186 A1* | 7/2021 | Margolin | G06N 3/08 |
| 2021/0256464 A1* | 8/2021 | Kasanen | G06Q 50/28 |

OTHER PUBLICATIONS

Barth, A. "HTTP State Management Mechanism," UC Berkeley Task Force Request for Comments, Apr. 2011, https://tools.ietf.org/html/rfc6265#section-6.1.

Developer. Apple, "Instance Property—Identifier For Vendor—An alphanumeric string that uniquely identifies a device to the app's vendor," https://developer.apple.com/documentation/uikit/uidevice/1620059-identifierforvendor.

http://browsercookielimits.squawky.net/ as archived from Dec. 25, 2017 by archive.today.

* cited by examiner

SYSTEMS AND METHODS FOR SECURE IDENTIFIERS FOR ELECTRONIC TRANSACTIONS

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the merchant transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

To prevent fraudulent transactions, such as when a proffered payment received by the commerce system utilizes a stolen card number, a card number from an expired card, a spoofed card, or other fraudulent card data, the commerce system may perform fraud detection for transactions. Such fraud detection can include attempting to determine, based on parameters associated with a transaction, whether there is a likelihood that the transaction is fraudulent. For example, whether a card number is associated with one or more past fraudulent transactions, associated with one or more declined transactions, associated with one or more reversals, associated with one or more authorization requests, placed on a blacklist, or associated with one or more other types of transactions which may be indicative of transaction fraud. Thus, the fraud detection seeks to determine when one or more factors associated with the transaction indicate fraud, such as by employing machine learning techniques to analyze transaction data to predict the likelihood of transaction fraud.

However, fraud detection is often limited to the transaction data in front of the commerce platform at the time of the transaction for a given payment instrument (e.g., a card number and a transaction parameters), and any existing relevant historical records. This leaves open a vulnerability where fraudulent actors may perform card testing of stolen card numbers (e.g., physically stolen cards, electronically stolen cards purchase on the black market, etc.) in a way that avoids detection, such as by seeking a temporary authorization, running a transaction of a small dollar amount, etc., which are not likely to be detected by the owner of card, in order to determine if a stolen card is active. Furthermore, single low value transactions are often not likely to be detected by traditional rule-based fraud detection models, machine learning models trained to recognize fraud based on action counts, IP address information, etc., or a combination of fraud detection techniques, due to the card testing's limited timing, scope, and transaction types. As a result, when the card is determined by a fraudster to be active, the card information may then be used for high value fraud (e.g., large purchases or cash advances), sold to other fraudulent actors who will use the active card to perpetrate high value fraud, etc. leading to potential losses to the commerce platform, a card owner, and/or card brands. This problem is exacerbated by fraudsters that perform mass carding, where a batch of stolen card information is tested to determine which card data is still active before it is sold to other fraudulent actors.

Therefore, a technical approach to detecting fraud in any transaction, including those used by card testing fraudsters, fraudulent actors performing low value/single use test-type transaction, as well as other types of transactions, and which is secure, cannot be faked by a fraudster, is efficient in terms of network communication, and reveals fraudulent activity, is needed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
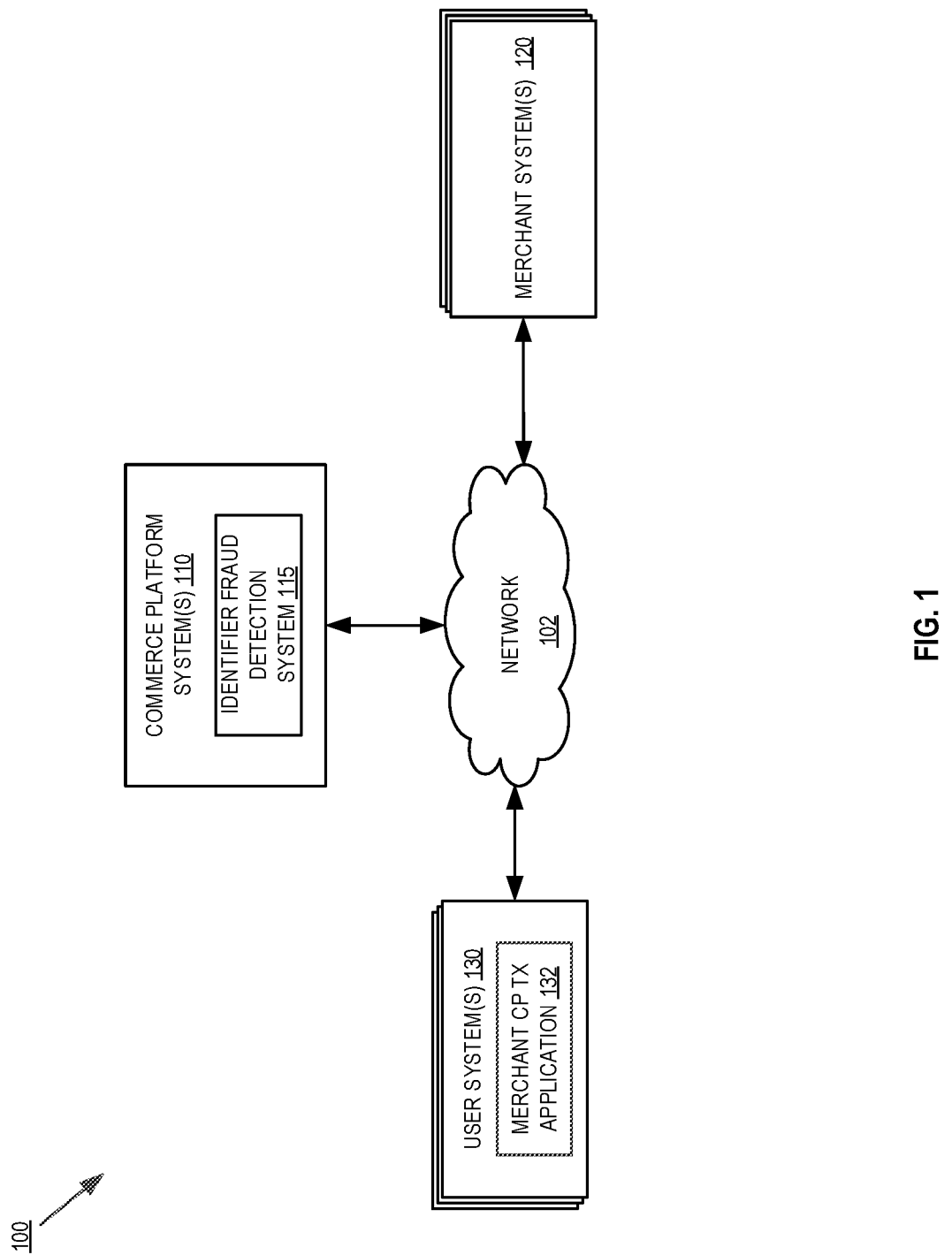
FIG. 1 is a block diagram of an exemplary system architecture for using secure identifiers for fraud detection in network based transactions.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "collecting", "generating", "mapping", "returning", "processing", "extracting". "accessing", "verifying", "detecting", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for identity-based fraud detection. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during electronic transactions conducted over a network may use and/or extend the techniques discussed herein to identity based fraud detection However, to avoid obscuring the embodiments discussed herein, fraud detection during network based commercial transactions is discussed to illustrate and describe the embodiments of the present invention, and is not intended to limit the application of the techniques described herein from applicability to other systems in which fraud detection could be used.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or merchant user system(s) 130. For example, commerce platform system(s) 110 may manage merchant accounts held at the commerce platform, run financial transactions initiated at user system(s) 130 performed on behalf of a merchant system 120, clear transactions, performing payouts to merchant and/or merchant agents, manage merchant and/or agent accounts held at the commerce platform system(s) 110, as well as other services typically associated with commerce platforms systems such as, for example, STRIPE™.

In one embodiment, merchant system 120 provides a merchant commerce platform transaction application (merchant CP TX app 132). The merchant CP TX app 132, in embodiments, is a web page based application by which merchant system 120 offers goods or services to a user of user system 130. However, other types of merchant applications (e.g. mobile apps, standalone applications, etc.) may also be integrated with the services of the commerce platform, including the use of secure identifiers, as discussed herein. For example, the merchant CP TX app 132 may provide a listing of products, services, pricing, etc. that a user of user system 130 may use to configure a purchase. In embodiments, the merchant CP TX app 132 is integrated with one or more functions, API(s), etc. of the commerce platform, which enable the commerce platform to perform aspects of the transaction directly between the user system 130 and the commerce platform system 110. For example, commerce platform system code and/or API(s) integrated into the merchant CP TX app 132 enable commerce platform systems 110 to handle the collection of purchase card information, collection of user information, etc. from a user of user system 130 in order to process a merchant-user transaction. Through the deployment of the commerce platform functionality (e.g., code, API(s), etc.), commerce platform system 110 not only handles financial aspects of the user-merchant transaction, but further insulates the exposure of the user's financial information to the merchant's application and/or merchant system. Approaches of integrating commerce platform code, API(s), etc. into a merchant web based application, mobile app, etc. for processing transactions, are described in U.S. Pat. No. 9,940,653, titled "SYSTEMS AND METHODS FOR A COMMERCE PLATFORM COORDINATING TRANSACTIONS WITHIN THIRD PARTY APPLICATIONS", issued on Apr. 10, 2018, as well as in U.S. Pat. No. 9,830,596, entitled "METHOD FOR CONDUCTING A TRANSACTION BETWEEN A MERCHANT SITE AND A CUSTOMER'S ELECTRONIC DEVICE WITHOUT EXPOSING PAYMENT INFORMATION TO A SERVER-SIDE APPLICATION OF THE MERCHANT SITE", and issued on Nov. 28, 2017, which are incorporated by reference herein in its entirety.

To prevent fraudulent transactions, in embodiments, commerce platform system(s) 110 utilizes identifier fraud detection system 115. As will be discussed in greater detail below, the identifier fraud detection system 115 employs a lightweight and secure identifier for a user system. The secure identifier is "secure" because a fraudulent actor cannot fake and/or generate a secure identifier, and the identifier's lack of validity is detectable when a fraudulent actor seeks to use a stolen but otherwise legitimate secure identifier, as discussed in greater detail below.

In order to generate and use a secure identifier, in embodiments, identifier fraud detection system 115 collects device information from user system 130 during an initial transaction. The merchant CP TX app 132, in embodiments, is configured to collect and communicate the device information from user system 130 to identifier fraud detection system 115. For example, the device information may be device fingerprint information, such as device attributes including device identifier(s), device features, an IP address, a TLS fingerprint, device manufacturer, software executed at a user system, software version, etc. as well as a combination of such information. Identifier fraud detection system 115 stores the collected device attribute(s) in a data store associated with the user.

Identifier fraud detection system 115 then generates a globally unique identifier, such as a universally unique identifier (UUID), that uniquely identifies the user and/or user device 130 to the commerce platform system 110. Furthermore, identifier fraud detection system 115 generates secure message authentication code. In embodiments, the secure message authentication code (MAC) is generated by a cryptographically secure process, such as the generation of a hash-based message authentication code (e.g., an HMAC identifier) generated by applying a process involving a cryptographic function, a secret cryptographic key selected by, and known only to, the commerce platform system 110, and the UUID (e.g., the secure MAC=F (globally unique identifier, secret)). In embodiments, the secret cryptographic key is deterministic so that when the commerce platform system 110 knows the UUID, the commerce platform system 110 may securely determine the secret cryptographic key, and perform the cryptographically secure process to regenerate the secure message authentication code using the cryptographically secure process. For example, commerce platform system 110 may use a hashing function, salt selection, or other technique for selecting a secret for a globally unique identifier. However, because the secret cryptographic key and/or key selection process is not known to actors outside of the commerce platform system 110 (e.g., fraudulent actors), and the commerce platform system applies a cryptographic process to generate a non-reversible secure MAC, the secure MAC cannot be regenerated by outside actor even with knowledge of the globally unique ID.

In embodiments, the identifier fraud detection system 115 then maps the collected device attribute(s) to the secure message authentication code in a data store at the commerce platform system 110, such as in a user account in a commerce platform system data store. By creating this mapping, commerce platform system 110 has created an association between the user system's 130 device attributes and the secure message authentication code.

Figure 6A:
FIGS. 6A-6E illustrate embodiments of a secure identifier.
Figure 6B:
Figure 6C:
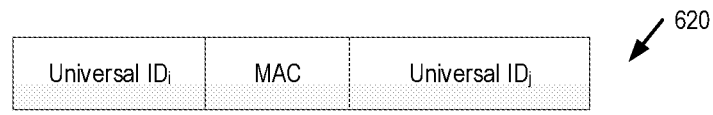
Figure 6D:
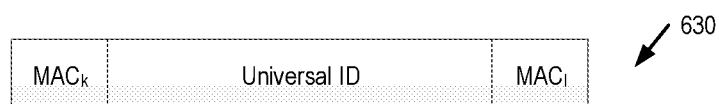
Figure 6E:
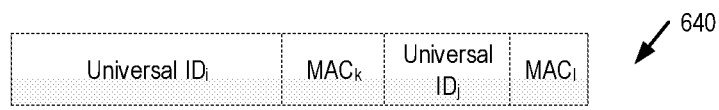

Identifier fraud detection system 115 then combines the globally unique identifier with the secure message authentication code to generate a secure identifier that uniquely and securely identifies the user/user system 130. In embodiments, as illustrated in FIG. 6A-6E, the secure identifier is an identifier formed by identifier fraud detection system 115 in one of several different ways. In one embodiment, the secure identifier may be formed by adding (e.g., concatenating into a single identifier) the secure message authentication code after an end of the globally unique identifier 600 as illustrated in FIG. 6A, or before the globally unique identifier 610 as illustrated in FIG. 6B. In another embodiment, the secure message authentication code may be added in an intermediate portion of the secure identifier, such as between a first portion of the globally unique identifier and a second portion of the globally unique identifier 620 as illustrated in FIG. 6C. In yet another embodiment, the secure message authentication code may be split and added before and after the globally unique identifier 630, as illustrated in FIG. 6D. In another embodiment, both the globally unique identifier and the secure message authentication code may be divided and the constituent parts combined 640, as illustrated in FIG. 6E. Any number of divisions, locations, permutations, etc. may be made to the globally unique identifier and/or secure message authentication code when combing, so long as no data of the globally unique identifier and secure message authentication code is lost, and commerce platform system 110 is aware of the number of divisions, locations, permutations, etc. of the combined globally unique identifier and secure message authentication code, so that commerce platform system 110 is able to accurately extract the globally unique identifier and the secure message authentication code from any received secure identifier.

The secure identifier, which combines the globally unique identifier generated for a particular user with a secure message authentication code securely generated using a cryptographic protocol, is therefore a cryptographically signed identifier that is unique to each user, and authenticatable by the commerce platform system 110. Furthermore, by collecting device attribute(s) and mapping those attributes to secure MACs, the secure identifier also uniquely identifies each user system 130. In some embodiments, such as where a user is associated with multiple user system(s) (e.g., laptop, mobile phone, etc.), identifier fraud detection system may maintain more than one secure identifier for the user for each user device (e.g., multiple globally unique identifiers and secure MACs for each user device), or may use a single globally unique identifier and secure MAC mapped to a collection of device attribute(s) collected from multiple devices. Identifier fraud detection system 115 returns the secure identifier to the user system 130. In either embodiment, the secure identifier is returned as data contained within a device cookie for storage in a local storage of the user system 130. Additional information may be included in the device cookie, such as any information that enables the commerce platform system 110 and/or merchant system 120 to track a user system during user-merchant transactions. Furthermore, in embodiments, user authorization is obtained prior to depositing the device cookie on user system 130.

In embodiments, in subsequent transactions, when a user system 130 utilizes merchant CP TX app 132 to perform a transaction with the commerce platform system 110, identifier fraud detection system 115 collects a secure identifier from the user system 130 (e.g., by collecting a device cookie and extracting the secure identifier from the device cookie, by receiving the secure identifier from the merchant CP TX app 132 as a transaction attribute, or a combination), as well as device attributes of a device supplying the cookie/secure identifier. The obtained secure identifier, is parsed by the identifier fraud detection system 115 to extract the globally unique identifier and the secure message authentication code from the obtained secure identifier. The globally unique identifier is then used by the identifier fraud detection system 115 to determine a secret that the secure cryptographic protocol will use with the extracted globally unique identifier to recreate a secure message authentication code. Because only the commerce platform system 110 is aware of the secret, how it is selected, and then applies it using a secure cryptographic protocol (e.g., a HMAC generation protocol), if the extracted secure message authentication code matches the generated secure message authentication code, identifier fraud detection system 115 can conclude that the secure message authentication code is a valid secure message authentication code (e.g., one generated by the identifier fraud detection system 115). This determination is a factor that favors a finding of a non-fraudulent transaction, as discussed below.

However, before clearing the transaction as non-fraudulent, identifier fraud detection system further compares the collected user system 130 device attributes with those previously collected (e.g., stored in a user data store and associated with the extracted globally unique ID) to determine if there is a sufficient device attribute match. For example, if a first set of device attributes initially collected from a user system indicates a user has a first type of device and uses a first type of web browser, but the device attributes used in subsequent transaction show a different device type and/or different type of web browser, identifier fraud detection system 115 may determine that the transaction is fraudulent (e.g., a different device not associated with the user is seeking to use a user's card information with a stolen secure identifier). Device attribute matching may be rules based (e.g., rules that define when an attribute difference indicates fraud, such as an original device was associated with a first manufacturer, but a current device seeking to use the same secure identifier is associated with a second manufacturer), utilize machine learning techniques (e.g., more fine grained decisions based on device attributes, such as whether a same software application, but showing different versions, is associated with fraud, where such machine learning techniques are trained using fraud detection training data), or a combination of rule and machine learning based techniques. Thus, even if a secure identifier is stolen but legitimate, and sought to be used in type of transaction that is otherwise hard to detect (e.g., card authorization testing, transaction for $1, etc.), device attribute mismatches are detectable by identifier fraud detection system 115 to determine that the device seeking to use the secure identifier is likely a legitimate device (e.g., same or highly similar device attributes) or a fraudulent device (e.g., different device attributes).

In embodiments, once the secure identifier regeneration and device attribute matching are performed by identifier fraud detection system 115, and stored device attributes are determined to match collected device attributes, a transaction may be cleared by identifier fraud detection system 115 as non-fraudulent. However, in other embodiments, the transaction may additionally be analyzed by transaction parameter based fraud models (e.g., machine learning models trained to detect fraudulent transactions based on the parameters of a transaction, counts associated with past transactions, transaction value, transaction location origination, etc.).

Therefore, the secure identifier generated by identifier fraud detection system 115 and deposited at user system 130, when used in conjunction with device attribute collection, provides a cryptographically secure mechanism that enables commerce platform system 110 to detect legitimate transactions, as well as fraudulent transactions that are otherwise difficult to detect. For example, carding fraudsters that perform mass testing of stolen cards, and which typically employ techniques that avoid detection by typical fraud detection models (e.g., low dollar transactions, card authorization testing, etc.), are detectable by the identifier fraud detection system 115 by performing verification of the secure message authentication code and/or device attribute(s) during a transaction.

Figure 2:
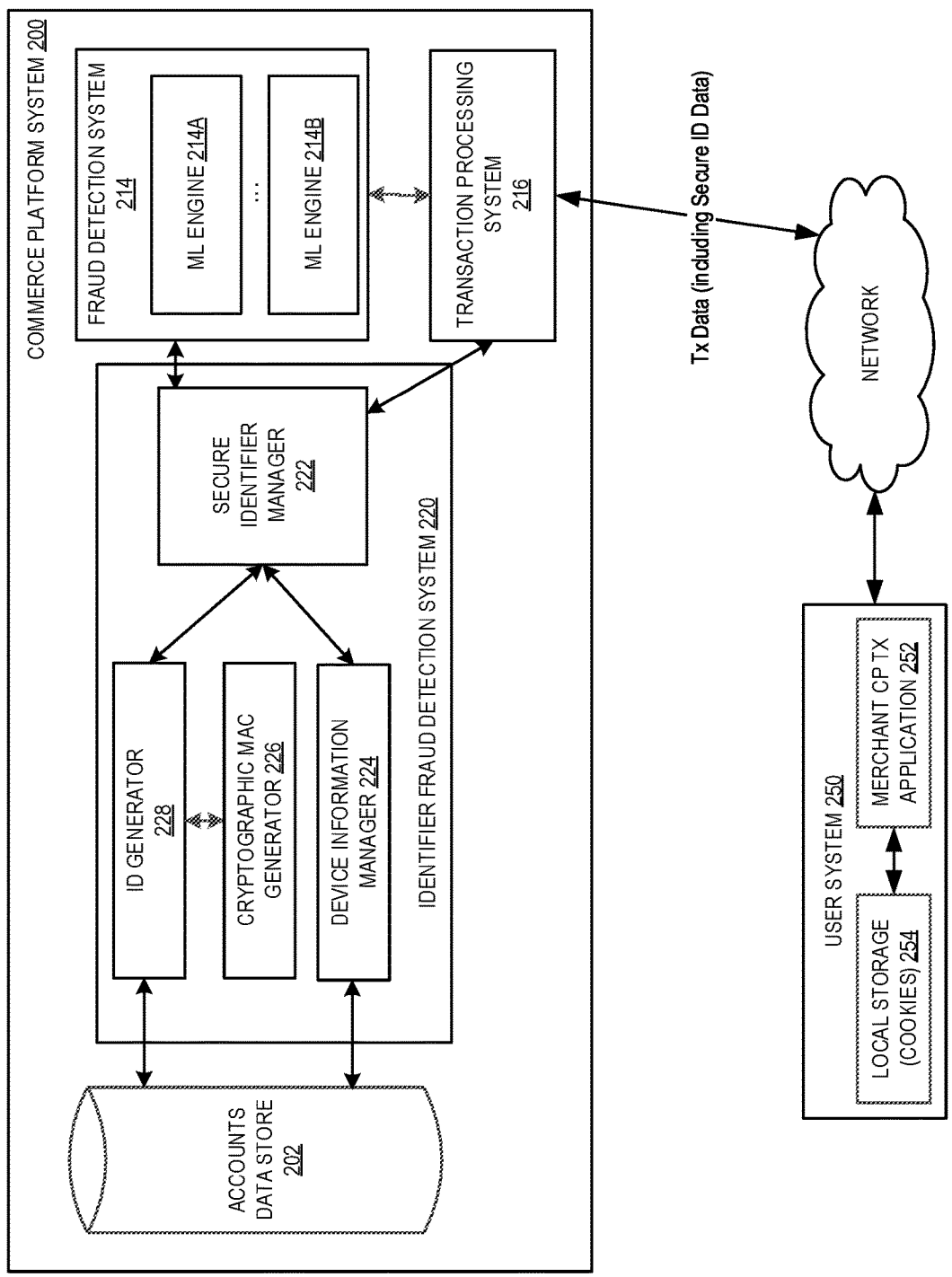
FIG. 2 is a block diagram of one embodiment of a commerce platform system using secure identifiers for fraud detection in network based transactions.

FIG. 2 is a block diagram of one embodiment of a commerce platform system 200 using secure identifiers for fraud detection in network based transactions. Commerce platform 200 provides additional details for the commerce platform system(s) 110 discussed above in FIG. 1.

In one embodiment, commerce platform 200 includes an accounts data store 202, an identifier fraud detection system 220, a fraud detection system 214, and a transaction processing system 216. As discussed herein, the identifier fraud detection system 220 may employ an ID generator 228, cryptographic message authentication code (MAC) generator 226, device information manager 224, and a secure identifier manager 226. In some embodiments, the secure identifier manager 222 may also interact with fraud detection system 214 to perform one or more types of machine learning model analysis.

Identifier fraud detection system 220 uses the secure identifier manager to process the generation and validation of secure identifiers, as discussed herein.

In embodiments, transaction processing system 216 is responsible for interfacing with merchant commerce platform transaction application (merchant CP TX app 252) during a user-merchant system transaction. For examples, commerce platform system API(s) generate API based message calls (e.g., get, post, etc.) to API endpoints of the commerce platform system 200 (e.g., transaction processing system 216 executing one or more API endpoints), the API message calls received and interpreted by transaction processing system 216. Furthermore, transaction information, such as card data, user data, purchase configurations, etc. are received by transaction processing system 216. Furthermore, in embodiments, transaction processing system 216 receives a secure identifier as a transaction parameter, which is purported to be associated with a device/user performing a current transaction. In embodiments, the secure identifier is data included in an API based message received from merchant CP TX application 252 and received by an API endpoint executed by transaction processing system 216. Transaction processing system 216 will process the transaction parameters to complete the transaction based on results of the identifier fraud detection system(S) 220 analysis, as well as results of the fraud detection system's 214 analysis.

In embodiments, for a received transaction, secure identifier manager 222 may receive a secure identifier or an indication that this is an initial transaction with commerce platform system 200. For an initial transaction, such as when an API message from merchant CP TX application 252 indicates that no secure identifier/cookie is located on user system 250, ID generator 228 generates a globally unique ID for the user/user system 250. For example, the globally unique ID may be generated using one of the universal unique identifier (UUID) protocols, such as UUID version 4. Furthermore, once generated, the generated globally unique identifier is provided to the cryptographic MAC generator 226.

Cryptographic MAC generator 226 applies a cryptographic protocol to generate a secure MAC using the globally unique identifier. In one embodiment, cryptographic MAC generator 226 applies the HMAC protocol to select a secret based on the globally unique identifier, and perform the HMAC protocol to generate the secure MAC from the secret and the globally unique identifier (e.g., secure MAC=$F_{HMAC}$ (globally unique ID, secret)). ID generator 228 receives the secure MAC, and combines/concatenates it with the globally unique identifier, forming the cryptographically signed secure identifier. Furthermore, ID generator 228 stores the secure MAC and globally unique ID in an accounts data store 202 account associated with a user of user system 250.

During the generation of the secure identifier, device information manager 224 further collects a set of one or more device attributes from the user system 250. In embodiments, the commerce platform API based calls, functions, etc. collect and transmit a set of device information, such as device identifier(s), software version(s), TLS fingerprint data, as well as other device attributes. Device information manager 224 stores the collected device attributes in the user account in data store 202, and secure identifier manager 222 maps the secure MAC to the set of device attributes. Furthermore, secure identifier manager 222 returns a device cookie to user system 250 for storage in local storage 254. The device cookie may include, among other data, the secure identifier (e.g., the globally unique identifier combined with the secure MAC).

Notice is then given to transaction processing system 216 that a new secure identifier was returned to user system 250, which clears the identifier validation for the pending transaction. Furthermore, as will be discussed below, fraud detection system 214 further uses transaction parameter data from the transaction for analysis by one or more machine learning engines 214A through 214B to perform fraud detection (e.g., count based fraud detection, IP address analysis, dollar amount prediction, etc.). Based on the results of the fraud detection system 214, as well as the identifier fraud detection system 220, transaction processing system will either allow or decline the user-merchant transaction which user system 250 is seeking to perform 250.

In embodiments, for the received transaction, when secure identifier manager 222 of the identifier fraud detection system 220 receives a secure identifier from transaction processing system 216 (e.g., merchant CP TX app 252 passes a secure identifier as a transaction parameter), secure identifier manager 222 performs secure identifier validation. In an embodiment, the purportedly valid secure identifier secure identifier (secure $ID_P$), is only purported to be valid until verified by identifier fraud detection system 220. The globally unique identifier ($ID_P$) and the secure MAC ($MAC_P$) are then extracted from the secure identifier (secure $ID_P$) by ID generator 228.

In embodiments, ID generator 228 and cryptographic MAC generator 226 then regenerate the secure MAC. More specifically, cryptographic MAC generator selects a secret using the globally unique identifier ($ID_P$), $F_{secret}(ID_P)$ =$secret_P$. Then, ID generator regenerates a secure MAC by performing secure $MAC_P$=$F_{HMAC}$ ($ID_P$, $secret_P$). ID generator 228 further utilizes the globally unique $ID_P$ to look up a true secure MAC associated with the globally unique ID, e.g., the secure MAC previously generated by the commerce platform system 210 and stored in a user account and associated with the globally unique ID. ID generator 228 then compares the extracted secure $MAC_P$ with the true secure $MAC_T$. When the secure MACs match, the secure ID is deemed valid (e.g., the secure MAC was able to be recreated from the globally unique ID from the received secure ID).

Furthermore, ID generator 228 utilizes the secure $MAC_P$ to look up device attributes, Attribute(s) T, in data store 202. The stored attributes are those previously collected by commerce platform system 200, and considered to be the true attributes of the user device 250. Simultaneously, device information manager 224 collects device attributes from user system 250 (Attribute(s) p) that is currently performing the transaction. Then, similar to the above discussion, a comparison of Attribute(s) T and Attribute(s) p is performed to determine if the same device is being used. Thus, when the device attributes are collected during a transaction match, secure identifier manager is able to conclude that the device for which the secure identifier was originally generated (and the secure MAC was regenerated), is the device which provided the secure identifier for the current transaction. Thus, a positive secure identifier match result is provided to transaction processing system 216 to enable the transaction to proceed.

Furthermore, in embodiments, fraud detection system 214 applies one or more machine learning engines 214A through 214B to perform additional fraud detection prior to approving a transaction. In embodiments, fraud detection system 214 includes one or more machine learning analysis engines, such as ML engines 214A and 214B, utilized in determining whether a current or future transaction is fraudulent. When a likely fraudulent transaction is detected, based on a set of user features, the transaction may be cancelled to prevent loss due to the transaction. In certain aspects, the ML engine(s) 214A and 214B implement at least one machine learning model selected from the following non-limiting examples: Random Forest, Classification and Regression Tree, boosted tree, neural network, support vector machine, general chi-squared automatic interaction detector model, interactive tree, multi-adaptive regression spline, and naïve Bayes classifier. In one embodiment, the models of ML engines 214A and 214B are an XGBoost tree-based model and a deep neural network model, however, other models or combination of models may be used. In the embodiments, the ML engines 214A and 214B can be used to determine, for a given transaction and features determined for an identity, the likelihood that the transaction is fraudulent based at least in part on a prediction of the probability or likelihood of the feature set associated with the identity indicating fraudulent activity. This likelihood can be mapped to a standard scale (e.g., between 0.0 and 1.0), or other value, from which a determination of likelihood of fraud may be predicted.

To determine the probability or likelihood that a transaction is fraudulent, the ML engines 214A and 214B may create or utilize one or more models. In an embodiment, models can be constructed, trained, and refined to use feature sets associated with transaction parameters, such as counts of associated with card data (e.g., total number of transactions, number of declines, number of chargebacks, number of reversals, etc.). Furthermore, user based factors associated with card data, such as expected transaction amount, expected IP address, expected contact information, etc. may also be used by ML engine(s) 214A through 214B.

In embodiments, the models used by ML engine(s) 214A and 214B can at least partially be created offline using transaction features and transaction records associated with prior fraud detection. In embodiments, ML engine(s) 214A and 214B can be trained using training data based on various user and/or transaction based features, and may further be refined over time based future transactions for which no fraud was detected and no fraud existed, no fraud was detected but fraud did exist, fraud was detected and no fraud existed, fraud was detected and fraud did exist. In embodiments, such training data may be gathered from a transaction data store (not shown). Furthermore, in embodiments, such training data may be extended to include device attributes, such as device make and/or model matches/mismatches, software application matches/mismatches, application version differences in software applications, etc. to determine when device attributes (e.g., used in the device attribute matching discussed above) that do not exactly match stored device attributes are indicative or not indicative of fraud. Thus, when, as discussed above, an attribute match is performed to compare collected attributes when a secure identifier was generated with attributes for a pending transaction, secure identifier manager 222 may use fraud detection system 214 to determine when attribute mismatches are indicative of fraud (e.g., an updated software version may not indicate fraud, but using a different web browser may be indicative of fraud) or not indicative of fraud (e.g., a stored device attribute indicated version 9 of a browser was used when a secure ID was originally generated, and a received device attribute indicates version 9.2 is being used in a transaction for which that secure ID is purported to be valid).

In embodiments, one or more ML training techniques appropriate for a given model may be executed by ML engine(s) 214A and 214B periodically as new/additional training data becomes available, as well as in real-time using, for example, session data and transaction data as transactions occur. The specific models used for a predicting the likelihood of fraud may vary based on factors such as whether a user has been uniquely identified, the extent to which information about the user can be automatically collected (e.g., using cookies, client-side libraries), the extent to which the user has a transaction history, and other factors. Models can be constructed for varying levels of specificity, including at the individual user/identity level, cohort level in which users sharing similar characteristics are grouped, merchant level, and merchant cohort level in which users sharing similar characteristics are grouped. Each of these models can be created using multiple features, including features drawn identities.

In some embodiments, a Random Forest technique, such as XGBoost may be used in determining whether a transaction is likely to be fraudulent. Random forests can be an ensemble learning method for classification, regression and other tasks, that operate by constructing a multitude of decision trees at training time and outputting the class that is the mode of the classes (e.g. classification) or mean prediction (e.g. regression) of the individual trees. As an ensemble method, Random Forest can combine one or more 'weak' machine-learning methods together. Random Forest can be used in supervised learning (e.g. classification and regression), as well as unsupervised learning (e.g. clustering). The random forest approach may be used in binary classification mode in which the probability of that given transaction is fraudulent based on a feature set is mapped to between 0 and 1. Using Random Forest, three phases of model construction and evaluation can be employed: testing, training, and prediction. By way of example, a testing phase may be employed in which historical data about feature sets, such as all transactions completed in 2019, is used to make a model. Once validated, the models may be used in prediction, to predict on new or live features during transactions the probability or likelihood of a fraudulent transaction.

In embodiment, ensemble methods may also be provided in embodiments, such as combining ML analysis performed by ML engines 214A and 214B. In statistics and machine learning, ensemble methods can use multiple ML model analysis techniques to obtain better predictive performance than could be obtained from any of the constituent learning algorithms. In an example, two models are generated and combined to create one prediction, with one model using the XGBoost technique and one model using a deep neural network (DNN) technique. However, other and additional models may be used including, but not limited to, regular random forest, one balanced random forest, support vector machine, etc. Each is trained to predict the probability or likelihood of a given transaction being fraudulent using user features, such as traditional user features and those from identities, as discussed herein. Different models can then be ensembled together to deliver a single result that can have more power to detect fraudulent transactions, and provide a better prediction accuracy than any one model individually. In some embodiments, the predictions of the models may be weighted, combined using conditional probabilities on permutations, using a purely Bayesian methodology, and/or using cross-validation, etc.

After training of the models used by ML engines 214A through 214B, transaction processing system 216 and/or identifier fraud detection system 220 may employ fraud detection system 214 during transactions to use the ML engines 214A through 214B to predict whether an incoming transaction is likely fraudulent, as discussed above. In embodiments, transaction manager 216 and/or identifier fraud detection system 220 may pass certain transaction attributes (e.g., card number, name on card, email used in a transaction, device attribute(s), etc.) to fraud detection system 214. Then, these pieces of information may be used by ML engine(s) 214A through 214B to predict fraud at the secure identifier validation phase and/or transaction processing phase of a given transaction. ML engine(s) 214A through 214B either individually or collectively make a fraud determination for the transaction, which is provided to transaction manager 216 to either accept or reject the transaction.

ML engine(s) 214A through 214B either individually or collectively may also make attribute fraud matching determinations for fraud detection, which is provided identifier fraud detection system 220 to either accept or reject a purported secure identifier based on device attributes.

Thus, as discussed herein, based on the results of the analysis of the identifier fraud detection system 220 verifying that a received cryptographically signed secure identifier is valid based on device attribute analysis, and/or fraud detection system 214 verifying that transaction parameter(s) are not indicative of transaction fraud based on analysis of counts associated with card data, the transaction processing system 216 completes the processing of the transaction.

Figure 3A:
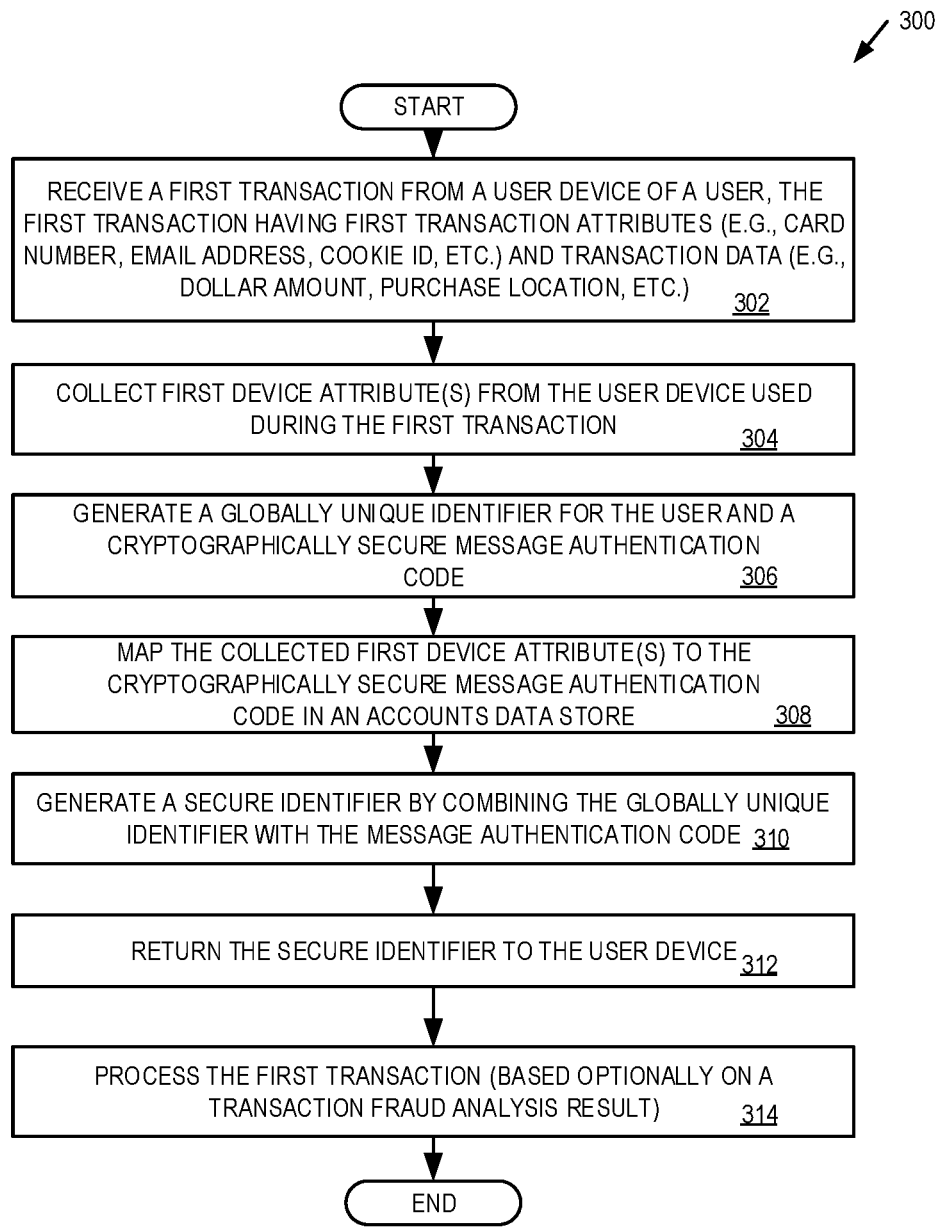
FIG. 3A is a flow diagram of one embodiment of a method for generating secure identifiers for fraud detection in network based transactions.

FIG. 3A is a flow diagram of one embodiment of a method 300 for generating secure identifiers for fraud detection in network based transactions. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3A, processing logic begins by receiving a first transaction from a user device of a user, the first transaction having first transaction attributes (e.g., card number, email address, billing address, etc.) and transaction data (e.g., dollar amount, transaction type, purchase location, device location, etc.) (processing block 302). In embodiments, the transaction is a commercial transaction in which a commerce platform is used to run, clear, etc. a transaction, for example, on behalf of a merchant. Furthermore, in an embodiment, the transaction may include a secure identifier or an indication that no such secure identifier exists on a user device that is performing the first transaction.

Processing logic collects first device attribute(s) from the user device used during the first transaction (processing block 304). In embodiments, the device attributes are received in API based messages, and can include various device attributes. For example, a set of one or more device attributes collected by processing logic may include a device identifier, a device manufacturer, an IP address, a TLS fingerprint, an operating system type and/or version, a web browser type and/or version, etc., as well as any combination of attributes.

Processing logic generates a globally unique identifier for the user and a cryptographically secure message authentication code (processing block 306). In embodiments, the globally unique identifier is generated using a protocol that avoids ID regeneration collisions, such as the UUID version 4 protocol for generating unique identifiers. The secure message authentication code is generated by processing logic using a cryptographic protocol, such as the HMAC protocol that includes selecting a secret, and then computing a cryptographically secure function with the secret and the globally unique identifier as inputs. The result, for example using the HMAC protocol, is the generation of an alphanumeric string that is not reversible, and can only be recreated if the secret and globally unique ID are known, as well as how the cryptographic protocol is implemented.

Processing logic maps the collected first device attributes to the cryptographically secure message authentication code in an accounts date store (processing lock 308). In embodiments, the accounts data store may include user data, such as user account data with which the device attribute(s) are associated and the globally unique identifier. However, processing logic may associate secure MACs with device attributes and/or globally unique IDs even when users have not created accounts, the storage of which is performed for future transactions. Furthermore, the user/user device may be identified in the accounts data store by the globally unique identifier.

Processing logic generates a secure identifier by combining the globally unique identifier with the message authentication code (processing block 310). As discussed above, the globally unique identifier and the secure message authentication code may be combined and/or concatenated in various ways, as illustrated in FIGS. 6A-6E. Processing logic returns the secure identifier to the user device (processing block 312). In an embodiment, the secure identifier is returned as data within a cookie, for storage in a local storage of the user device participating in the transaction. Thus, processing logic may generate a device cookie and/or update an existing device cookie with the secure identifier at processing block 312.

Processing logic then processes the first transaction (processing block 314). For example, processing logic would run card numbers, clear a transaction with a card brand, banking, or other system, return transaction results to a user system, credit merchant and/or agents associated with the transaction, as well as other operations associated with the processing and/completion of a transaction. In embodiments, the transaction processing may also include performing a machine learning analysis on transaction parameters in order to predict fraud, and then accept or decline the transaction based on results of the fraud prediction.

Figure 3B:
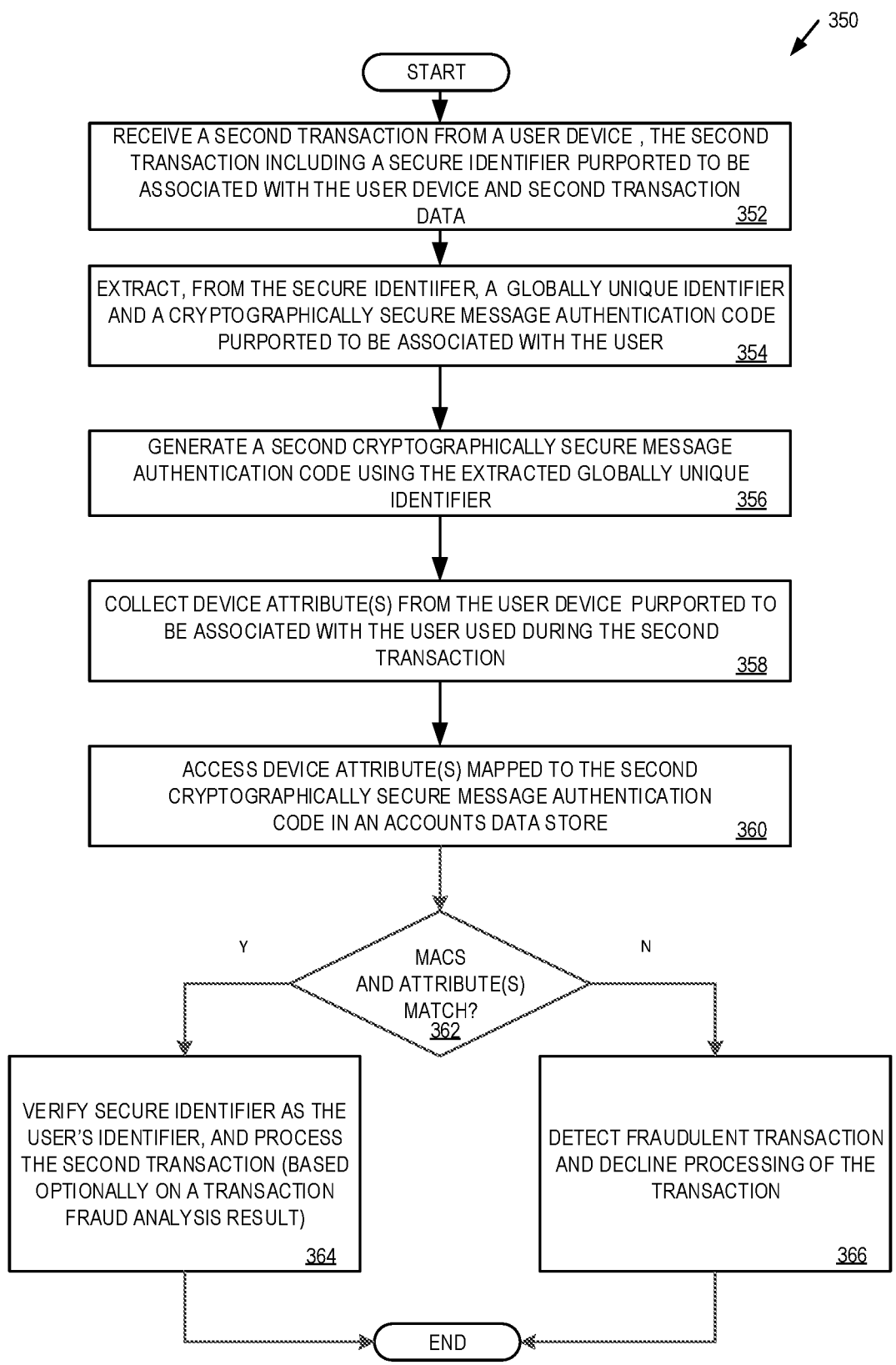
FIG. 3B is a flow diagram of one embodiment of a method for using secure identifiers to detect fraud in network based transactions.

FIG. 3B is a flow diagram of one embodiment of a method 350 for using secure identifiers to detect fraud in network based transactions. The method 350 is performed by processing logic that may comprise hardware (circuitry, dedicated logic, etc.), software (such as is run on a general purpose computer system or a dedicated machine), firmware, or a combination. In one embodiment, the method 350 is performed by a commerce platform system (e.g., commerce platform system 110 or commerce platform system 200).

Referring to FIG. 3B, processing logic begins by receiving a second transaction from a user device, the second transaction including a secure identifier purported to be associated with the user device and second transaction data (processing block 352). As discussed above, the secure identifier is passed as a transaction parameter, along with the second transaction data such as card data, transaction amount, IP address, etc., used for the transaction. As discussed herein, a commerce platform system integrated merchant application may invoke commerce platform system software, code, APIs, etc., to generate and exchange network based messaging during the transaction, including passing processing logic the secure ID and other transaction data as transaction parameters.

Processing logic extracts, from the secure identifier, a globally unique identifier and a cryptographically secure message authentication code purported to be associated with the user (processing block 354). In embodiments, processing logic is aware of the way in which the globally unique identifier and the secure MAC were combined, and may thus parse the received secure identifier to extract each of the globally unique identifier and the secure MAC from the secure identifier. Furthermore, processing logic considers the globally unique identifier and the secure MAC as purportedly valid until validation processing is concluded.

To perform validation, processing logic generates a second cryptographically secure message authentication code using the extracted globally unique identifier (processing block 356). As discussed herein, this includes using the globally unique identifier to determine a secret, and then perform a cryptographic protocol using the extracted identifier and the secret. The second cryptographically secure message authentication code is considered the true secure MAC that the commerce platform system would generate using the extracted globally unique identifier.

Processing logic may also collect device attributes from the user device purported to be associated with the user device during the second transaction (processing block 358), and access the device attributes mapped to the second cryptographically secure message authentication code in an account data store (processing block 360).

Processing logic then determines whether both the secure MACs match (e.g. the purported secure MAC extracted from the received secure identifier and the regenerated secure MAC) and the device attributes match (e.g., the purported device attributes collected during the second transaction and the stored device attributes collected during an initial, first transaction) (processing block 362). In embodiments, the attribute matching may be a rule based matching, may apply machine learning models to determine when variations in attributes are indicates/not indicative of fraud, or a combination.

Based on the matching results determined at processing block 362, processing logic either verifies the secure identifier as valid thereby allowing the second transaction to continue (processing block 364), or detects potential fraud when there is a mismatch in one or both of the secure MACs and/or the device attributes to stop the transaction (processing block 366). When the transaction is allowed to continue, based on the matching results, in embodiments, the transaction attributes may be analyzed by ML model(s)/ML engine(s) to determine, based on one or more transaction parameters whether the parameters are likely to be associated with fraud. Similarly, attribute matching may also use ML based methods to allow for detection of variations in attributes that are/are not associated with fraud.

Figure 4:
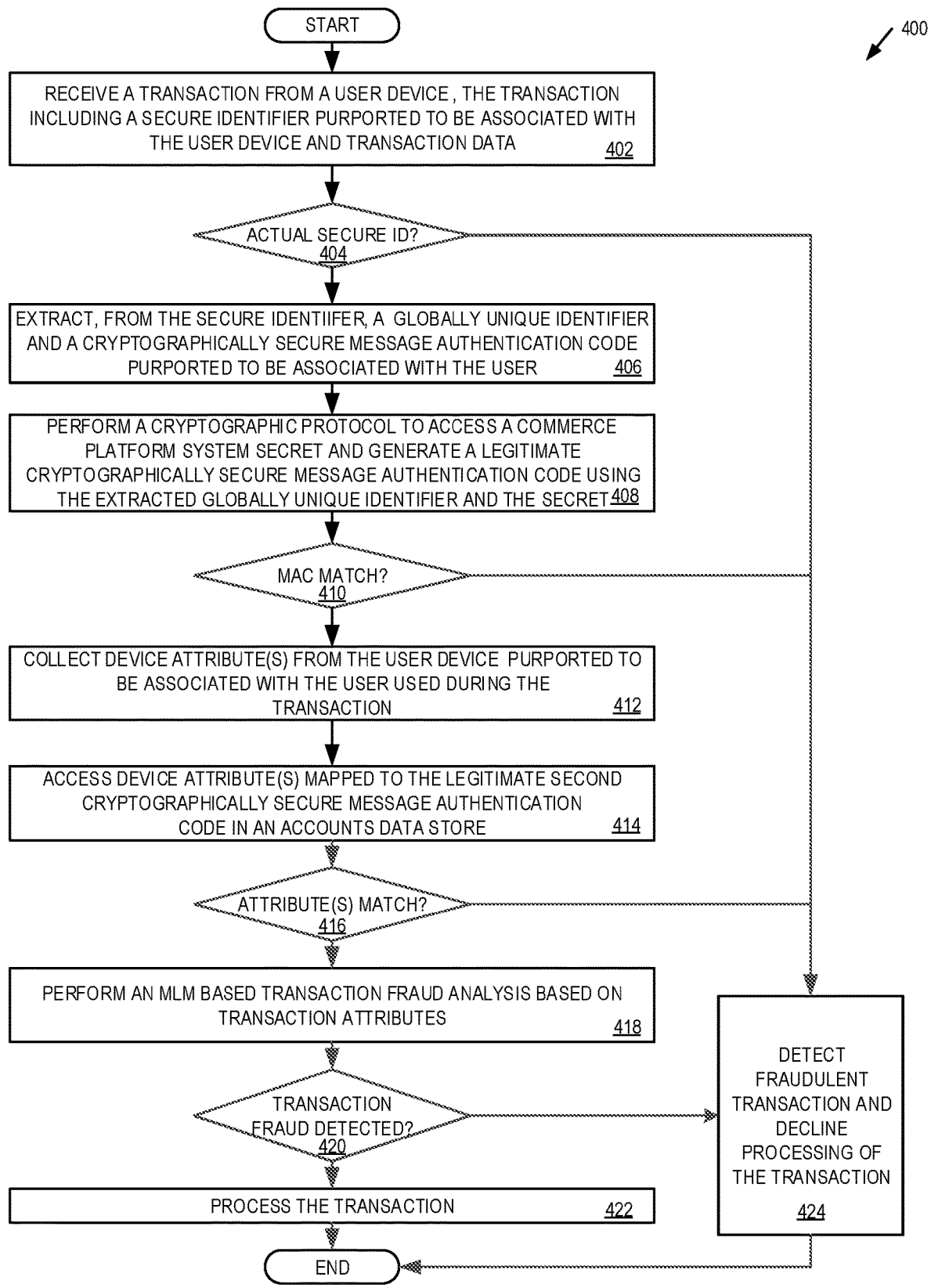
FIG. 4 is a flow diagram of one embodiment of a method for performing multi-level fraud detection in a network based transaction in which a secure identifier is used.

FIG. 4 is a flow diagram of one embodiment of a method 400 for performing multi-level fraud detection in a network based transaction in which a secure identifier is used. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200). Furthermore, the method 400 is performed to detect transaction fraud at several levels and at several points during a transaction to provide multi-level transaction security.

Referring to FIG. 4, processing logic begins by receiving a transaction from a user device, the transaction including a secure identifier purported to be associated with the user device and transaction data (processing block 402). Processing logic determines whether the received secure identifier is an actual secure identifier (processing block 404). That is, processing logic verifies the formatting, size, characters used, and other factors associated with the received secure identifier to ensure that it complies with the parameters of commerce platform secure identifiers. For example, if the receive secure identifier includes 30 characters, but commerce platform secure identifiers each have 32 characters, then the secure ID can be quickly identified as fraudulent, and rejected (processing block 424). Therefore, when the received secure ID is not an actual secure ID, the process ends and the transaction is declined.

When the secure ID is an actual secure identifier (e.g., matches formatting requirements), processing logic proceeds to extract the constituent parts of the received purportedly valid secure identifier and regenerate a true cryptographically secure message authentication code (processing blocks 406 and 408), which are described above in FIG. 3B in greater detail.

When the regenerated secure MAC does not match the purported secure MAC extracted from the received secure identifier, the transaction is identified as fraudulent (processing block 410), and rejected (processing block 424).

However, when there is a secure MAC match, processing logic collects device attributes (e.g., device ID(s), software version(s), software app type(s), OS type, device manufacturer, etc.) from the device purported to be associated with the user and used during the transaction (processing block 412). In embodiments, device attribute(s) collection may occur simultaneously with any and/or all of processing blocks 402-410. Furthermore, processing logic accesses the device attributes mapped to the legitimately secure MAC regenerated by processing logic (processing block 414). Processing logic then determines if there is an attribute match (processing block 416). In embodiments, attribute matching may be rules based, based on ML engine analysis, or a combination, as discussed above. When the attributes stored by processing logic, for example in an accounts data store, do not match the attributes collected from the device during the current transaction (processing block 416), the transaction is determined to be fraudulent and rejected (processing block 424).

When there is an attribute match, however, processing logic performs a machine learning analysis of the transaction parameters/attributes (processing block 418). For example, one or more machine learning models trained to recognize fraudulent transactions based on expected transaction amount, numbers of events associated with card data, locations from which transactions originate, etc. can be applied to analyze the transaction parameters/attributes to detect when fraud is likely to be occurring. When fraud is detected by one or more of the ML models/engines (processing block 420), transaction fraud is detected and the transaction is rejected (processing block 424).

When fraud is not detected by the ML analysis, the transaction is processed in order to complete the transaction between the user and a merchant system (processing block 422).

Therefore, as discussed above, several levels of fraud detection are employed to detect fraudulent transactions at several stages in the processing of the transaction, including rejecting transactions that fail for secure identifier formatting issues, the inability of processing logic to regenerate a received secure MAC, detecting device attribute mismatches associated with likely fraud, and then MLM analysis of transaction parameters to detect fraud when the parameters are likely associated with fraud. The use and validation of secure identifiers therefore enables fraud detection earlier in the transaction process and at various stages of transaction processing. Furthermore, and as discussed above, the secure identifiers enable a commerce platform system to identify fraud that would typically avoid detection by MLM model analysis. However, the MLM model analysis may still be employed to ensure robust fraud detection with respect to the parameters of a transaction.

Additionally, the secure identifier, and secure MAC used to generate the secure identifier, use cryptographically secure protocols to secure the integrity of the secure identifier from fraudulent actors' ability to recreate secure identifiers. Furthermore, as discussed above, even if a legitimate secure identifier is stolen and used by a fraudulent actor, the fraudulent transaction may still be detected. Thus, fraud detection is improved enabling commerce platform system to increase the success rate at which fraud may be detected, broaden what types of transactions in which fraud can be detected, and otherwise improve network based transaction fraud detection, as discussed herein.

Figure 5:
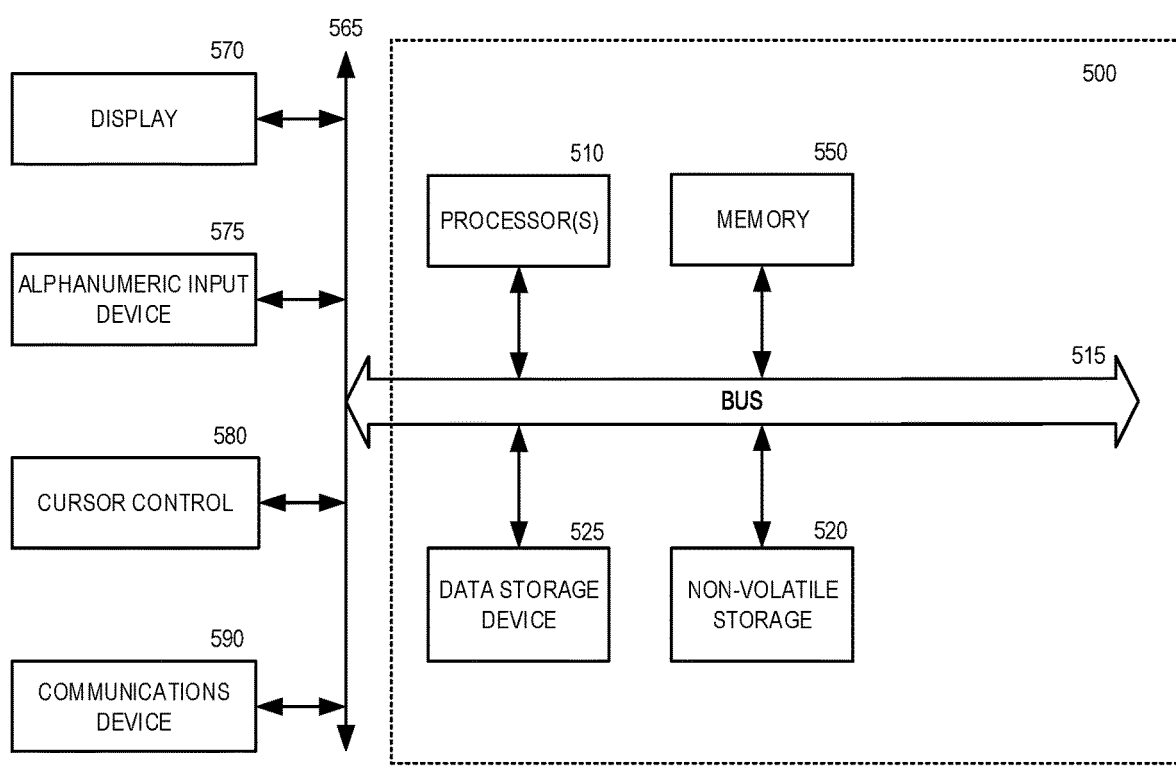
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant development system, merchant user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for using cryptographically signed secure identifiers to detect fraud, the method comprising:
   receiving, at a computing system, a first request from a user device, the first request comprising at least card data and data indicating that a secure identifier does not exist at the user device;
   generating, by the computing system, a globally unique identifier for the user;
   generating, by the computing system, a secure message authentication code using the globally unique identifier as an input to a cryptographic protocol;

forming, by the computing system, the secure identifier by appending portions of the secure message authentication code before and after the globally unique identifier;
providing, by the computing system, the secure identifier to the user device;
receiving, at the computing system, a second request from a user device, the second request comprising the secure identifier purported to be associated with the user device;
extracting, by the computing system, from the secure identifier, the globally unique identifier and the secure message authentication code purported to be associated with the user device;
regenerating, by the computing system, a true secure message authentication code using the globally unique identifier, comprising:
  determining a secret, computed using the globally unique identifier, purported to be associated with the user device, and
  performing the cryptographic protocol using the secret and the globally unique identifier as inputs to the cryptographic protocol, wherein a result of the cryptographic protocol is the true secure message authentication code;
validating the secure identifier by comparing the true secure message authentication code with the secure message authentication code associated with the user device;
validating the user device by comparing a first set of device attributes collected from the user device during the second request with a second set of device attributes collected from the user device prior to the second request, wherein the comparing is based at least in part on a machine learning model analysis of the first set of device attributes in view of the second set of device attributes that determines that a combination of attribute matches and attribute mismatches is an indicative of fraud; and
processing the second request, by the computing system, based at least in part on a determination that the secure identifier is valid and the user device is a valid user device.

2. The method of claim 1, wherein prior to the extracting, the method further comprises:
determining, by the computing system, whether the extracted secure message authentication code satisfies a formatting requirement for secure message authentication codes;
when the formatting requirement is determined not to be satisfied by the extracted secure message authentication code, determining that the secure identifier is not an actual secure identifier, and rejecting the second request as not including a valid secure identifier; and
when the formatting requirement is determined to be satisfied by the extracted secure message authentication code, performing the extracting.

3. The method of claim 1, wherein the cryptographic protocol comprises a secure hash-based message authentication code generation protocol.

4. The method of claim 1, further comprising:
collecting, by the computing system during the second request, a first set of one or more device attributes from the user device;
accessing, by the computing system, a second set of one or more device attributes collected by the computing system prior to the second request, the second set of one or more device attributes mapped to the secure message authentication code in a data store;
when a comparison of the first set of one or more device attributes with the second set of one or more device attributes indicates a device attribute match, determining that the user device completing the second request is a valid user device; and
processing the second request, by the computing system, based at least in part on the determination that the true secure message authentication code matches the secure message authentication code parsed from the secure identifier, and further based on the user device being a valid user device.

5. The method of claim 4, further comprising:
performing the comparison of the first set of one or more device attributes with the second set of one or more device attributes: (1) based on a set of one or more corresponding rules that determine exact matches between each respective attribute a device attribute match, (2) based on a machine learning model analysis of the first set of one or more device attributes in view of the second set of one or more device attributes to determine a likelihood that attribute matches and attribute mismatches are attributable to fraud, or (3) based on a combination thereof.

6. The method of claim 1, the second request further comprising the at least card data and one or more request parameters, wherein the one or more request parameters comprise a request amount, a request type, a request origination location, an internet protocol address of the user device, an identity of a user associated with the request, or a combination thereof.

7. The method of claim 6, wherein processing the second request further comprises:
processing the second request, by the computing system, based at least in part on an analysis of the at least card data and the one or more request parameters by a machine learning model trained to predict a likelihood of fraud based on historical request records associated with the at least card data, the one or more request parameters for the second request, or a combination thereof.

8. The method of claim 1, wherein the secure message authentication code is generated by:
applying a cryptographic function with the secret and the globally unique identifier as inputs to the cryptographic function;
combining, by the computing system, the globally unique identifier with the secure message authentication code to form an initial secure identifier; and
returning, by the computing system, the initial secure identifier to the user device.

9. The method of claim 8, further comprising:
collecting a set of one or more device attributes associated with the user device during the second request; and
mapping the secure message authentication code to the set of one or more device attributes in a data store.

10. The method of claim 9, wherein the set of one or more device attributes comprises data indicative of one or more of: a user device identifier, a user device manufacturer, an internet protocol address associated with the user device, transport layer security fingerprint data associated with the user device, an operating system type and/or operating system version executed by the user device during the initial request, and a web browser type and/or web browser version used by the user device during the second request.

11. The method of claim 8, wherein the secure identifier is returned to the user device as data included in a device cookie, the device cookie for storage in a local storage of the user device.

12. The method of claim 1, wherein the second request is received over a communications network as one or more application programming interface (API) based messages generated by a computing system API executed by an interface accessed by a user of the user device to perform the second request.

13. A non-transitory computer readable storage medium including instructions that, when executed by a processor, cause the processor to perform operations for using cryptographically signed secure identifiers to detect fraud, the operations comprising:
receiving, at a computing system, a first transaction from a user device, the first transaction comprising at least card data and data indicating that a secure identifier does not exist at the user device;
generating, by the computing system, a globally unique identifier for the user;
generating, by the computing system, a secure message authentication code using the globally unique identifier as an input to a cryptographic protocol;
forming, by the computing system, the secure identifier by appending portions of the secure message authentication code before and after the globally unique identifier;
providing, by the computing system, the secure identifier to the user device;
receiving, at the computing system, a second transaction from a user device, the second transaction comprising the secure identifier purported to be associated with the user device;
extracting, by the computing system, from the secure identifier, the globally unique identifier and the secure message authentication code purported to be associated with the user device;
regenerating, by the computing system, a true secure message authentication code using the globally unique identifier, comprising:
determining a secret, computed using the globally unique identifier, purported to be associated with the user device, and
performing the cryptographic protocol using the secret and the globally unique identifier as inputs to the cryptographic protocol, wherein a result of the cryptographic protocol is the true secure message authentication code;
validating the secure identifier by comparing the true secure message authentication code with the secure message authentication code associated with the user device;
validating the user device by comparing a first set of device attributes collected from the user device during the second transaction with a second set of device attributes collected from the user device prior to the second transaction, wherein the comparing is based at least in part on a machine learning model analysis of the first set of device attributes in view of the second set of device attributes that determines that a combination of attribute matches and attribute mismatches is an indicative of fraud; and
processing the second transaction, by the computing system, based at least in part on a determination that the secure identifier is valid and the user device is a valid user device.

14. The non-transitory computer readable storage medium of claim 13, further comprising:
collecting, by the computing system during the second transaction, a first set of one or more device attributes from the user device;
accessing, by the computing system, a second set of one or more device attributes collected by the commerce platforms system prior to the second transaction, the second set of one or more device attributes mapped to the secure message authentication code in a data store;
when a comparison of the first set of one or more device attributes with the second set of one or more device attributes indicates a device attribute match, determining that the user device completing the second transaction is a valid user device; and
processing the second transaction, by the computing system, based at least in part on the determination that the true secure message authentication code matches the message authentication code parsed form the secure identifier, and further based on the user device being a valid user device.

15. The non-transitory computer readable storage medium of claim 13, wherein the secure message authentication code is generated by:
applying a cryptographic function with the secret and the globally unique identifier as inputs to the cryptographic function;
combining, by the computing system, the globally unique identifier with the secure message authentication code to form an initial secure identifier; and
returning, by the computing system, the initial secure identifier to the user device.

16. A system for using cryptographically signed secure identifiers, comprising:
a memory; and
a processor coupled with the memory configured to:
receive a first request from a user device, the first request comprising at least card data and data indicating that a secure identifier does not exist at the user device;
generate a globally unique identifier for the user;
generate a secure message authentication code using the globally unique identifier as an input to a cryptographic protocol;
form the secure identifier by appending portions of the secure message authentication code before and after the globally unique identifier;
provide the secure identifier to the user device;
receive a second request from a user device, the second request comprising the secure identifier purported to be associated with the user device;
extract, from the secure identifier, the globally unique identifier and the secure message authentication code purported to be associated with the user device;
regenerate a true secure message authentication code using the globally unique identifier, comprising:
determine a secret, computed using the globally unique identifier, purported to be associated with the user device, and
perform the cryptographic protocol using the secret and the globally unique identifier as inputs to the cryptographic protocol, wherein a result of the cryptographic protocol is the true secure message authentication code;
validate the secure identifier by comparing the true secure message authentication code with the secure message authentication code associated with the user device;

validate the user device by comparing a first set of device attributes collected from the user device during the second request with a second set of device attributes collected from the user device prior to the second request, wherein the comparing is based at least in part on a machine learning model analysis of the first set of device attributes in view of the second set of device attributes that determines that a combination of attribute matches and attribute mismatches is an indicative of fraud; and process the second request, by the computing system, based at least in part on a determination that the secure identifier is valid and the user device is a valid user device.

\* \* \* \* \*